Sept. 9, 1924.  1,508,341
J. E. LATHAN
CHARGING DEVICE FOR GREASE GUNS
Filed June 19, 1922
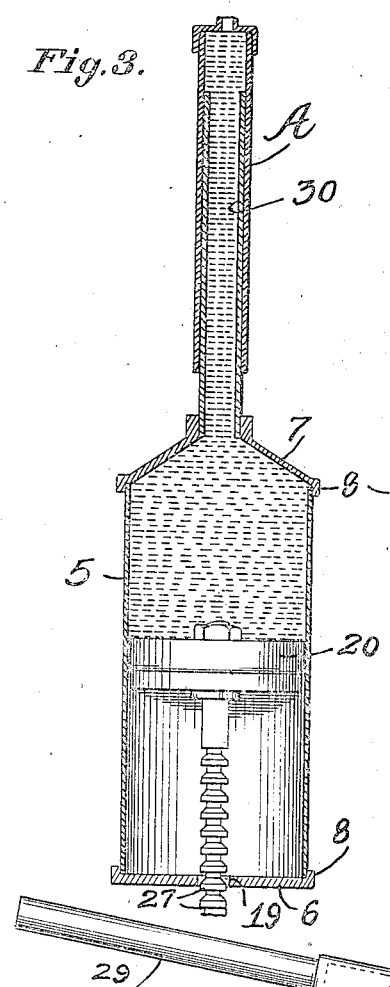
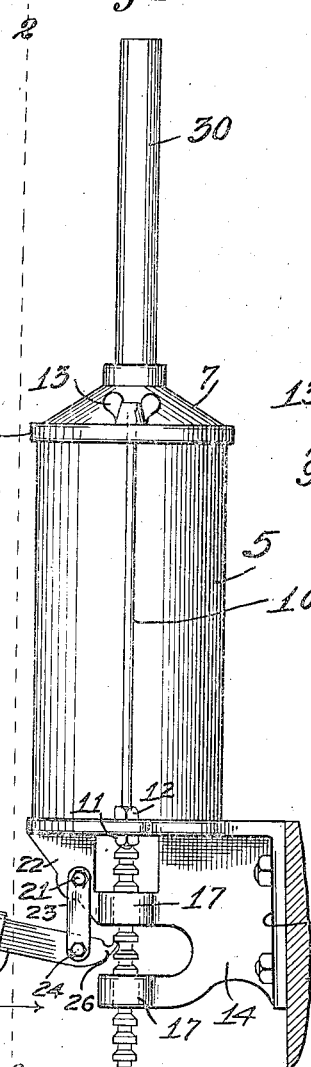
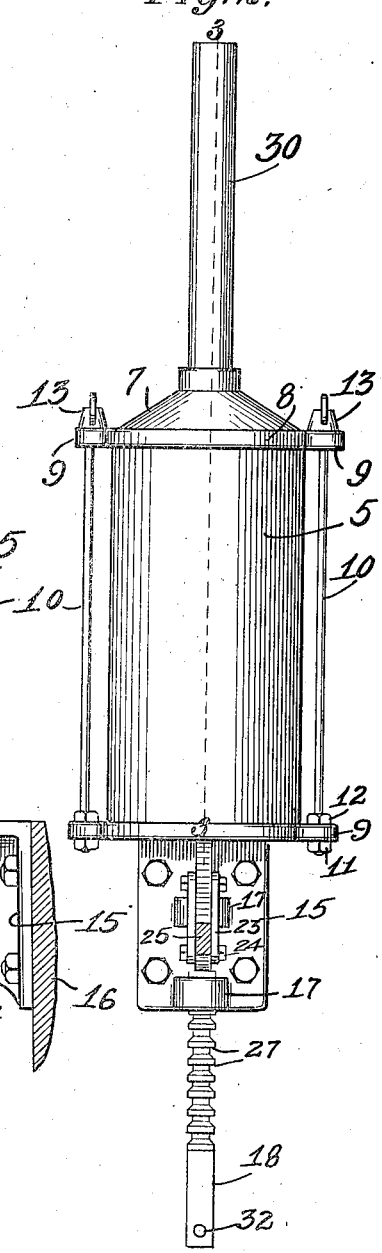
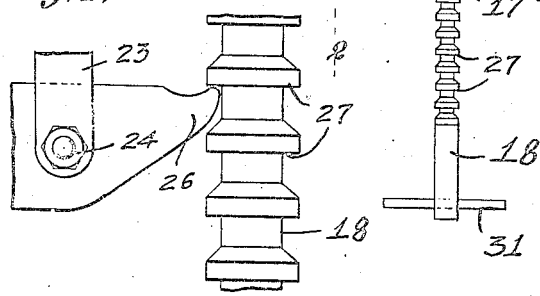
Inventor,
J. E. LATHAN
By ———— Attorneys.

Patented Sept. 9, 1924.

1,508,341

UNITED STATES PATENT OFFICE.

JULIUS EDWARD LATHAN, OF SAN FRANCISCO, CALIFORNIA.

CHARGING DEVICE FOR GREASE GUNS.

Application filed June 19, 1922. Serial No. 569,236.

*To all whom it may concern:*

Be it known that I, JULIUS EDWARD LATHAN, a citizen of the United States, and resident of city and county of San Francisco and State of California, have invented a new and useful Charging Device for Grease Guns, of which the following is a specification.

The present invention, while relating in general to lubricating equipment, has reference more particularly to a charging device for grease guns which are commonly used as a part of such equipment.

The primary object of the invention is to provide a device especially adapted for use in garages or even individual owners to enable a charge of grease or the like lubricant to be forced into the grease gun in a convenient and quick manner so as to avoid the customary hand filling operation which has proven so unsatisfactory from a practical standpoint.

The further object of the invention is to provide a device which may be manufactured and sold to the trade at a comparatively cheap price so that not only will it find a ready market in repair shops, garages and other like places, where lubricant is handled on a large scale but also to individuals who would use the device less frequently.

The invention possesses further objects and features which will appear as the description now proceeds with reference to the accompanying drawing in which a practical working embodiment of the device is shown for the purpose of illustrating its application. In said drawing, Figure 1 is a view in side elevation of the complete device.

Figure 2 is a side view taken along the line 2—2 of Figure 1.

Figure 3 is a vertical section along the line 3—3 of Figure 2 and Figure 4 is an enlarged detailed view of the plunger mechanism.

Referring now to the drawing in detail, 5 represents a relatively large cylinder made to accommodate a large quantity of lubricant such as grease or the like. The cylinder is preferably made with a removable base 6 and a removable conical head 7. Both the base and head are made with flanged edges as at 8 to overlap the open ends of the cylinder and with offset and outwardly projecting ears 9 arranged on diametrically opposite sides of both the head and base adapted to receive the ends of the rods 10 which are used for clamping the base and head to the cylinder. The lower ends of the rods 10 are fixed to the ears 9 of the base 6 by nuts 11 on the under side of the ears and locking nuts 12 on the opposite side of the ears. The ears on the head 7 are slotted to receive the upper ends of the rods 10 and the wing nuts 13 on the upper extremities of the rods 10 are used for fixing the rods to the ears as well as producing a clamping effect by drawing the base 6 and the head 7 tightly down over the open ends of the cylinder. When the cylinder is to be filled the wing nuts 13 are loosened so that the rods 10 may be slipped out of the slots in the ears 9 of the head 7 so that the head 7 may be removed.

The base 6 is preferably cast or otherwise made with a web 14 terminating in a T headed plate 15 which may be used as a convenient means for attaching or mounting the device to a stand or other suitable supporting structure 16. The web 14 is further made with a pair of spaced collars 17 co-axially arranged, through which the plunger rod 18 extends with freedom and reciprocation. The plunger rod 18 enters the cylinder 5 through an opening 19 in the base 6 and carries a plunger 20 which has a tight fit with the diameter of the cylinder and is, of course, provided with the customary packing to prevent leakage.

The collars 17 practically provide a guide for the plunger rod 18 and also add rigidity to the structure which is, of course, desirable, due to the use required of the device. Pivotally connected on the forward end of the web 14 are a pair of links 23, the opposite ends of which being in turn pivotally connected as at 24 to the end of a short lever 25, the outer extremity of which is made with a nose 26 adapted to engage the flat surface on the under side of each of the flanges 27 formed throughout the greater part of the length of the plunger rod 18. The opposite end of the lever 25 is made with a sleeve 28 to receive the end of a lever 29 to increase the effective leverage of the lever 25.

The lever arrangement therefore, is adapted to impart a progressive lifting action or upward thrust to the plunger 20 by the spaced stepped relation of the flanges 27 on the plunger rod 18 so that the plunger may forcefully discharge any portion or the whole of the contents of the cylinder.

Arranged at the apex of the conical head 7 is an upstanding pipe 30, the same establishing an uninterrupted communication with the cylinder and the conical shape of the head 7 will direct the lubricant into the pipe when an upward thrust is imposed on the plunger by the operating lever. In practice, the grease gun A to be filled is slipped over the pipe 30 after the closure for one end of the gun has been removed and when the lubricant is forced through the pipe 30 it will fill the entire area of the gun and as the filling action takes place the gun is raised upwardly on the pipe and when the open end of the gun reaches the open end of the pipe, the gun will have been filled. It is then ready for use. Due to the large quantity of lubricant contained in the cylinder and the forceful effect of the plunger, the gun will be filled very quickly and with very little effort on the part of the operator actuating the lever.

The size of the grease gun to be filled makes no difference so long as it is not smaller than the pipe 30, since it must telescope within the pipe to realize the best results.

When the whole of the lubricant has been discharged from the cylinder and the cylinder is to be filled, a pin or the like 31 is inserted through an opening 32 in the lower end of the plunger rod 18 to provide a purchase so that the plunger may be pulled down to leave the inside area of the cylinder unobstructed to receive a re-fill of lubricant.

I claim:

1. In a grease gun filler, a bracket adapted for securing to a support, a cylindrical grease container mounted at one end on the bracket and having a discharge opening at the opposite end, a piston within the cylinder with a rod extending therefrom through the bracket and being guided in spaced bearings on the bracket, a hand lever pivotally supported from the bracket adapted to engage the rod between the bearings for forcing the rod and piston into the cylinder upon operating the lever.

2. In a grease gun filler, a bracket adapted for securing to a support, a cylindrical grease container mounted at one end on the bracket and having a discharge opening at the opposite end, a piston within the cylinder with a rod extending therefrom and past the bracket, a bearing on the bracket slidably supporting the rod, a hand lever suspended on a link pivotally secured to the bracket and adapted to engage the rod adjacent the bearing for forcibly moving the rod and piston in the cylinder, the link permitting the lever to be moved bodily from the rod for disengagement.

JULIUS EDWARD LATHAN.